US010659586B2

(12) United States Patent
Cheng et al.

(10) Patent No.: US 10,659,586 B2
(45) Date of Patent: May 19, 2020

(54) INTELLIGENT REARVIEW MIRROR

(71) Applicant: BOE Technology Group Co., Ltd., Beijing (CN)

(72) Inventors: Xinyi Cheng, Beijing (CN); Changlin Leng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/123,903

(22) Filed: Sep. 6, 2018

(65) Prior Publication Data

US 2019/0230207 A1    Jul. 25, 2019

(30) Foreign Application Priority Data

Jan. 22, 2018   (CN) .......................... 2018 1 0059687

(51) Int. Cl.
*H04B 7/00* (2006.01)
*H04M 1/60* (2006.01)
(Continued)

(52) U.S. Cl.
CPC .............. *H04M 1/6091* (2013.01); *B60R 1/12* (2013.01); *H04B 1/3822* (2013.01); *H04W 4/44* (2018.02); *H04W 4/48* (2018.02); *H04W 4/80* (2018.02); *B60R 1/04* (2013.01); *B60R 2001/1276* (2013.01); *B60R 2001/1284* (2013.01); *G06F 3/041* (2013.01); *H04M 2250/02* (2013.01); *H04M 2250/22* (2013.01); *H04M 2250/74* (2013.01)

(58) Field of Classification Search
CPC ........ H04M 1/6091; H04W 4/48; H04W 4/44
See application file for complete search history.

(56) References Cited

U.S. PATENT DOCUMENTS 5,276,703 A * 1/1994 Budin .................. H04W 74/02
                                                  370/347
6,300,882 B1 * 10/2001 Inoue ................... G07B 15/063
                                                  340/928
(Continued)

FOREIGN PATENT DOCUMENTS

CN      102149051 A    8/2011
CN      202656936 U    1/2013
(Continued)

OTHER PUBLICATIONS

Office Action issued in related Chinese Patent Application No. 201810059687.4, dated Mar. 26, 2020.

*Primary Examiner* — Md K Talukder
(74) *Attorney, Agent, or Firm* — McDermott Will & Emery LLP

(57) ABSTRACT

The present application provides an intelligent rearview mirror. The intelligent rearview mirror comprises a mirror body; a main electronic device disposed on the mirror body, and comprising a main processor and a mobile communication module; and an in-vehicle terminal device, separated from the mirror body and the main electronic device, and configured to transmit a control signal to the main electronic device. The main processor is configured to control, according to the control signal, the mobile communication module to enter an intercom transmission mode or an intercom reception mode for intercom communication with a cloud serve.

16 Claims, 3 Drawing Sheets

(51) Int. Cl.
*H04W 4/44* (2018.01)
*H04W 4/48* (2018.01)
*H04W 4/80* (2018.01)
*H04B 1/3822* (2015.01)
*B60R 1/12* (2006.01)
*G06F 3/041* (2006.01)
*B60R 1/04* (2006.01)

(56) References Cited

U.S. PATENT DOCUMENTS

| | | | | |
|---|---|---|---|---|
| 6,532,374 | B1 * | 3/2003 | Chennakeshu | B60R 11/0241 455/569.1 |
| 10,049,559 | B2 | 8/2018 | Lee et al. | |
| 2002/0004416 | A1 * | 1/2002 | Baratono | B60R 1/12 455/569.2 |
| 2002/0082058 | A1 * | 6/2002 | Baratono | B60R 1/12 455/569.2 |
| 2004/0097263 | A1 * | 5/2004 | Katayama | H04L 12/462 455/556.1 |
| 2007/0082618 | A1 * | 4/2007 | Chen | B60R 1/12 455/66.1 |
| 2008/0273715 | A1 * | 11/2008 | Snider | B60R 1/12 381/86 |
| 2009/0096635 | A1 * | 4/2009 | McKenna | G08G 1/0965 340/901 |
| 2011/0269412 | A1 * | 11/2011 | Bergeron | H04B 1/385 455/78 |
| 2011/0287719 | A1 | 11/2011 | Pinder et al. | |
| 2013/0295908 | A1 * | 11/2013 | Zeinstra | H04M 1/72577 455/418 |
| 2015/0302735 | A1 * | 10/2015 | Geerlings | G08C 17/02 340/5.25 |
| 2017/0105120 | A1 * | 4/2017 | Kang | H04W 4/80 |
| 2017/0289359 | A1 * | 10/2017 | Keller | H04M 11/025 |
| 2017/0324854 | A1 * | 11/2017 | Badouin | H04M 1/663 |
| 2018/0222391 | A1 * | 8/2018 | Chen | B60R 1/12 |
| 2018/0327016 | A1 * | 11/2018 | Okazaki | G01V 3/08 |
| 2018/0370486 | A1 * | 12/2018 | Chin | B60R 25/241 |

FOREIGN PATENT DOCUMENTS

| | | |
|---|---|---|
| CN | 104516845 A | 4/2015 |
| CN | 205168358 U | 4/2016 |
| CN | 206004855 U | 3/2017 |
| CN | 106796745 A | 5/2017 |
| WO | 2012/139515 A1 | 10/2012 |

* cited by examiner

INTELLIGENT REARVIEW MIRROR

CROSS-REFERENCE TO RELATED APPLICATION(S)

This application claims priority to the Chinese Patent Application No. 201810059687.4, filed on Jan. 22, 2018, which is incorporated herein by reference in its entirety.

TECHNICAL FIELD

The present disclosure relates to the field of in-vehicle communication technologies, and more particularly, to an intelligent rearview mirror.

BACKGROUND

Interphones are essential devices for fleets of vehicles (for example, self-driving tour teams). However, interphones in the related art communicate with each other using analog radio signals, which can be seriously influenced by environments, and has a short communication distance and poor voice quality.

SUMMARY

According to an aspect of the present disclosure, there is provided an intelligent rearview mirror, comprising: a mirror body; a main electronic device disposed on the mirror body, and comprising a main processor and a mobile communication module; and an in-vehicle terminal device, separated from the mirror body and the main electronic device, and configured to transmit a control signal to the main electronic device. The main processor is configured to control, according to the control signal, the mobile communication module to enter an intercom transmission mode or an intercom reception mode for intercom communication with a cloud server.

In an embodiment, the main electronic device further comprises an integrated short-range wireless communication module, and the in-vehicle terminal device further comprises a terminal short-range wireless communication module, and transmits the control signal through communication between the integrated short-range wireless communication module and the terminal short-range wireless communication module.

In an embodiment, the main electronic device further comprises an integrated microphone and an integrated speaker, and the main processor is further configured to: control, in the intercom transmission mode, the integrated microphone to receive a voice signal, and control the mobile communication module to transmit the voice signal to the cloud server; and control, in the intercom reception mode, the mobile communication module to receive a voice signal from the cloud server, and control the integrated speaker to output the voice signal.

In an embodiment, the in-vehicle terminal device further comprises: a terminal function button configured to receive a user's press or release and generate a press signal or a release signal; and a terminal processor configured to generate the control signal according to the press signal or the release signal and transmit the control signal through the terminal short-range wireless communication module.

In an embodiment, the in-vehicle terminal device is integrated in a steering wheel.

In an embodiment, the in-vehicle terminal device comprises: a terminal microphone; a terminal speaker; a terminal function button configured to receive a user' press or release and generate a press signal or a release signal; and a terminal processor configured to generate the control signal according to the press signal or the release signal, wherein the terminal processor is further configured to: control, in the intercom transmission mode, the terminal microphone to receive a voice signal, and transmit the voice signal to the main electronic device; and receive, in the intercom reception mode, a voice signal from the main electronic device, and control the terminal speaker to output the voice signal, wherein, in the intercom transmission mode, the main electronic device transmits the voice signal to the cloud server through the mobile communication module after receiving the voice signal; and in the intercom reception mode, the voice signal from the main electronic device is received by the main electronic device from the cloud server.

In an embodiment, the terminal function button is a physical button.

In an embodiment, the in-vehicle terminal device is one of a handheld terminal device, a Bluetooth headset, or an in-vehicle audio system.

In an embodiment, the main electronic device further comprises a display screen, and the main processor is further configured to control, during an intercom call, the display screen to display one of information related to intercom members or connection state information of the in-vehicle terminal device.

In an embodiment, the display screen is a touch screen.

In an embodiment, the main electronic device further comprises an integrated function button for an intercom function, wherein the integrated function button is a physical button.

In an embodiment, the main electronic device further comprises an integrated function button for an intercom function, wherein the integrated function button is a virtual button on the touch screen.

In an embodiment, the main electronic device is connected to a vehicle control system, and the main processor is configured to receive an accident signal from the vehicle control system, generate rescue request information, and transmit the rescue request information to members of an intercom group through the mobile communication module.

According to another aspect of the present disclosure, there is provided a method for operating the intelligent rearview mirror described above, comprising: receiving, by the in-vehicle terminal device, a user input; transmitting, by the in-vehicle terminal device, a control signal to the main electronic device according to the user input; and entering, by the mobile communication module of the main electronic device, an intercom transmission mode or an intercom reception mode for intercom communication with the cloud server based on the control signal.

In an embodiment, in the intercom transmission mode, the main processor receives a voice signal from a user and transmits the voice signal to the cloud server; and in the intercom reception mode, the main processor receives a voice signal from the cloud server and outputs the voice signal to the user.

In an embodiment, in the intercom transmission mode, the in-vehicle terminal device receives a voice signal and transmits the voice signal to the main electronic device; and the main electronic device transmits, the voice signal to the cloud server after receiving the voice signal; and in the intercom reception mode, the main electronic device receives a voice signal from the cloud server, and transmits the received voice signal to the in-vehicle terminal device;

and the in-vehicle terminal device outputs the voice signal to the user after receiving the voice signal.

DETAILED DESCRIPTION

In order to enable those skilled in the art to better understand the solutions of the present disclosure, the intelligent rearview mirror having an integrated network intercom function according to specific embodiments of the present disclosure will be further described in detail below with reference to the accompanying drawings. Obviously, the described and illustrated embodiments, and various specific features therein, are merely exemplarily illustrative of the present disclosure and are not intended to limit the present disclosure. All other embodiments and specific features thereof obtained by those of ordinary skill in the art based on the exemplary illustration without any creative work are intended to be included in the protection scope of the present disclosure.

Figure 1A:
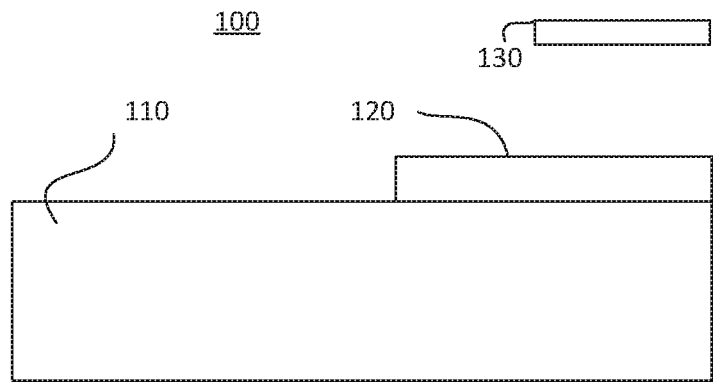
FIG. 1A illustrates a schematic structural diagram of an intelligent rearview mirror according to an embodiment of the present disclosure.

Reference is now made to FIG. 1A, illustrated is a structural block diagram of an intelligent rearview mirror 100 according to an embodiment of the present disclosure. As shown in FIG. 1A, the rearview mirror 100 comprises a mirror body 110, a main electronic device 120, and an in-vehicle terminal device 130. The main electronic device 120 is disposed on the mirror body 110. The in-vehicle terminal device 130 is disposed separately from the mirror body 110 and the main electronic device 120 and is configured to transmit a control signal to the main electronic device 120.

Figure 1B:
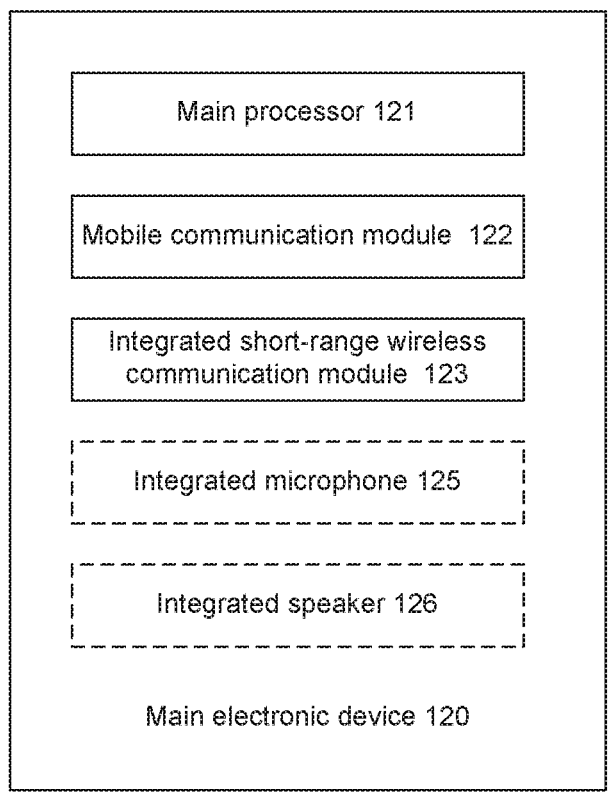
FIG. 1B illustrates a schematic block diagram of a main electronic device of an intelligent rearview mirror according to an embodiment of the present disclosure.

FIG. 1B illustrates a schematic block diagram of the main electronic device 120 of the intelligent rearview mirror according to an embodiment of the present disclosure. As shown in FIG. 1B, the main electronic device 120 comprises a main processor 121, a mobile communication module 122, and an integrated short-range wireless communication module 123. It should be understood that in other embodiments, the integrated short-range wireless communication module 123 may be omitted or replaced by other interfaces or modules.

The integrated short-range wireless communication module 123 is configured to receive a control signal from the in-vehicle terminal device; and the main processor 121 is configured to control the mobile communication module 122 to enter an intercom transmission mode or an intercom reception mode for intercom communication with a cloud server according to the control signal.

The control signal may comprise an intercom transmission activation signal and an intercom reception activation signal, which may be any signals that may be distinguished from each other to indicate that an intercom function button is pressed (to activate the intercom transmission mode), and that the intercom function button is released (to activate the intercom reception mode), respectively. The intercom function button may also be called a Push to Talk (PTT) function button.

In the intercom transmission mode, the main processor 121 may firstly transmit a message to the cloud server through the mobile communication module 122 to occupy a speaking right of an intercom group, and then may transmit a voice signal to the cloud server through the mobile communication module 122. In the intercom reception mode, the main processor 121 may receive a voice signal from the cloud server through the mobile communication module 122.

As will be appreciated by those skilled in the art, the mirror body 110 may generally further comprise a mirror surface (including a reflector, etc.) 104 at the front end of the rearview mirror, a housing, and securing means for securing the rearview mirror 100 to a vehicle body. In some embodiments, the main electronic device may be located within or on the housing of the mirror body without interfering with any location of reflection and/or display of the reflector and/or a display screen. It should be understood that the mirror body 110 and the main electronic device 120 may have a common portion. For example, a portion of the mirror surface of the mirror body 110 may be implemented by a display screen in the main electronic device 120.

The main processor 121 may be any apparatus having corresponding computing and control functions, for example, a microprocessor, a coprocessor, a processor, etc., or any other processing apparatus or unit including an integrated circuit such as an Application Specific Integrated Circuit (ASIC), a Field Programmable Gate Array (FPGA) etc. In some embodiments, the main processor may comprise an associated memory having a software program stored therein, which may be loaded and executed by the main processor 121 to perform functions or operations thereof.

The mobile communication module 122 may be a communication module or communication interface based on any mobile communication technology, for example, a communication module or communication interface based on a cellular network (for example, 2G, 3G, 4G, 5G, NB-IoT, etc.) The mobile communication module 122 may establish a connection with the cloud server and communicate with the cloud server through a corresponding mobile communication network (for example, a cellular network).

The integrated short-range wireless communication module 123 may be a communication module or communication interface based on any short-range wireless communication technology, for example, a WLAN module, a Bluetooth module (for example, Classic or BLE or 2-in-1 module) or a dedicated communication protocol module.

An operation flow of implementing an intercom function by the rearview mirror according to the embodiment of the present disclosure is as follows. A user establishes an intercom group in the cloud server in advance through a corresponding function button on the main electronic device 120 or the in-vehicle terminal device, or through an APP of a mobile phone. When the user needs to make an intercom, the user presses a PTT function button on the terminal device, the in-vehicle terminal device transmits an intercom transmission activation signal to the main electronic device 120, the mobile communication module 122 of the main electronic device 120 enters a transmission mode for intercom communication with the cloud server, so as to occupy a speaking right of the intercom group, activates real-time intercom, and then transmits voice information to the cloud server through a cellular network, and the cloud server further transmits the voice information to members of the intercom group. When the user releases the PTT button, the in-vehicle terminal device transmits an intercom reception activation signal to the main electronic device 120, the mobile communication module 122 of the main electronic device 120 enters a reception mode for intercom communication with the cloud server, so as to release the speaking right, receives voice information of the members of the intercom group from the cloud server through the cellular network, and broadcasts the voice information through a built-in speaker of the rearview mirror or the in-vehicle terminal device.

The main electronic device 120 according to the embodiment of the present disclosure activates the intercom transmission function and the intercom reception function respectively by receiving the intercom transmission activation signal or the intercom reception activation signal from the in-vehicle terminal device. As the in-vehicle terminal device is more portable, compared with a technical solution of activating the intercom transmission function and the intercom reception function by pressing a function button on the rearview mirror, the operation is more convenient while maintaining advantages in terms of performance, cost, etc. for the integration of the mobile communication module for an intercom function in the rearview mirror.

In some embodiments, the display screen and/or touch screen of the main electronic device may be used to display information related to intercom communication, for example, an intercom communication mode or state, a license plate number of an intercom member, and location information of a vehicle, etc., and may be used to display information such as operation functions etc. of the main electronic device 120.

In some embodiments, the display screen and/or touch screen of the main electronic device may be used to display connection state information of the in-vehicle terminal device.

In some embodiments, the main electronic device 120 may further comprise an integrated microphone 125 and an integrated speaker 126, and the main processor 121 is further configured to: receive, in the intercom transmission mode, a voice signal from the integrated microphone 125 and transmit the voice signal to the cloud server through the mobile communication module 122; and receive, in the intercom reception mode, a voice signal from the cloud server through the mobile communication module 122, and transmit the voice signal to the integrated speaker 126 for output.

In such an embodiment, as the main electronic device 120 further has the integrated microphone 125 and the integrated speaker 126 integrated therein, the main electronic device 120 has a higher integration degree, and the in-vehicle terminal device is easier to implement.

In some embodiments, the integrated microphone 125 and the integrated speaker 126 may be located within or on a housing of the main electronic device 120 without interfering with any location of reflection and/or display of the reflector and/or the display screen.

The integrated microphone 125 may be a single microphone or a dual microphone. With the dual microphone, ambient noises may be better filtered out.

In some further embodiments, the main electronic device 120 may further comprise an integrated function button 127. There may be one or more integrated function buttons 127, and the plurality of integrated function buttons 127 may be used for different functions, respectively. The integrated function button 127 may be, for example, a physical button, or a function button on the touch screen, or a contactless touch point.

In some further embodiments, the plurality of integrated function buttons 127 may comprise a function button for setting a de-noising mode. After the user presses the function button, the main processor 121 may enter the de-noising mode, in which the main processor 121 may filter out the ambient noises by processing a voice signal from the dual microphone 125, and may eliminate echo input through the speaker 126 by using an internal filtering algorithm.

In some further embodiments, the plurality of integrated function buttons 127 may comprise a function button for setting a normal voice mode or a high-definition voice mode. After the user presses the function button, the main processor 121 may be set to the normal voice mode or the high-definition voice mode. In the normal voice mode, the main processor 121 has a low sampling rate for a voice signal, for example, 8 KHz; and in the high-definition voice mode, the main processor 121 has a high sampling rate for a voice signal, for example, 32 KHz.

In some further embodiments, the plurality of integrated function buttons 127 may comprise a function button for adjusting an output volume of the integrated speaker 126, and the user may adjust the volume of the integrated speaker 126 by pressing the function button.

In some embodiments, the main electronic device 120 may be electrically connected to an onboard power source so as to be powered by the onboard power source. In some other embodiments, the main electronic device 120 may comprise a power module, for example, a battery module etc., so as to be powered by the power module.

In some embodiments, the main electronic device 120 may be connected to a vehicle control system, and the main processor 121 is configured to receive an accident signal from the vehicle control system, generate rescue request information, and transmit the rescue request information to the members of the intercom group through the mobile communication module 122. That is, the main electronic device according to the present disclosure may be configured to broadcast the rescue request information to the members of the intercom group when the vehicle has an accident, and may also make an alarm call and automatically play the rescue request information. For example, after a collision occurs in the vehicle and a person is in a coma, the vehicle control system detects the collision and sends an accident signal to the main electronic device 120. The main electronic device 120 detects the accident signal, and transmits rescue request information to the members in the group according to setting. In this way, the main electronic device 120 having an integrated intercom function according to the present disclosure has more additional useful functions and improves driving safety.

Figure 2:
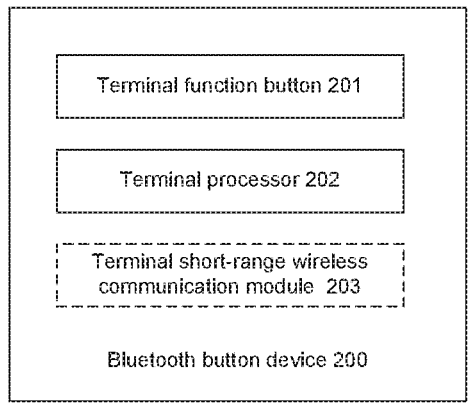
FIG. 2 illustrates a schematic block diagram of an in-vehicle terminal device of an intelligent rearview mirror according to an embodiment of the present disclosure.

In some embodiments of the present disclosure, the in-vehicle terminal device 130 is a Bluetooth button device. As shown in FIG. 2, according to some embodiments of the present disclosure, the Bluetooth button device 200 comprises: a terminal function button 201 configured to receive a user's press or release and generate a press signal or a release signal; a terminal processor 202 configured to generate the intercom transmission activation signal or the intercom reception activation signal according to the press signal or the release signal, and transmit the intercom transmission activation signal or the intercom reception activation signal through a terminal short-range wireless communication module 203; and the terminal short-range wireless communication module 203 configured to establish a connection with the integrated short-range wireless communication module 123 of the main electronic device, and transmit the intercom transmission activation signal or the intercom reception activation signal to the integrated short-range wireless communication module 123, wherein the integrated short-range wireless communication module 123 and the terminal short-range wireless communication module 203 are both Bluetooth modules.

The terminal function button 201 may be, for example, a physical button. As the physical button has certain rebound force feedback, tactile perception in a driver's operation is ensured, and the driving safety is improved.

The terminal processor 202 may be any processing apparatus or unit having corresponding control and processing functions, for example, a processing apparatus or unit including an integrated circuit such as an ASIC, a FPGA etc.

In the above embodiments of the present disclosure, a function of the function button on the main electronic device 120 is actually replaced by the Bluetooth button device 200, for example, the intercom transmission activation signal and the intercom reception activation signal are transmitted through the Bluetooth button device 200. Therefore, the driver does not need to raise his/her hand to touch a function button on the rearview mirror 100 to activate the intercom function, thereby improving the driving safety. In addition, as the Bluetooth button device 200 does not comprise a microphone and a speaker, and a microphone and a speaker integrated on the rearview mirror are used for voice input and output, the Bluetooth button device 200 is easier to implement and has a small size, for example, the Bluetooth button device 200 may be similar to a vehicle key in appearance.

In some further embodiments, the Bluetooth button device 200 further comprises a terminal battery module 204 to be powered by the terminal battery module 204. The terminal battery module 204 may be, for example, a button battery.

In some further embodiments, the Bluetooth button device 200 is integrated in a steering wheel, for example, at a location which facilitates manual operation by the driver. In this way, not only the driver's intercom operation is facilitated, and the driving safety is further ensured, but also the integration degree of the device can be further improved, so that the Bluetooth button device is not easily lost. Of course, in other embodiments, the Bluetooth button device 200 may also be a separate device which may be placed anywhere in the vehicle to facilitate intercom communication by passengers in the vehicle.

In some further embodiments, the display screen and/or the touch screen of the main electronic device 120 may also display, under the control of the main processor 121, connection state information of the Bluetooth button device 200, and may further display electricity amount information of the Bluetooth button device 200.

In some further embodiments, when the terminal function button 201 is not pressed, the Bluetooth button device 200 may be in a low power consumption sleep state. When the terminal function button 201 is pressed, the terminal processor 202 is activated, and transmits an intercom transmission activation signal to the main electronic device 120 through the terminal short-range wireless communication module 203; and after the terminal function button 201 is released, the terminal processor 202 transmits an intercom reception activation signal to the main electronic device 120 through the terminal short-range wireless communication module 203, and then transits to the low power consumption state.

In still other embodiments of the present disclosure, unlike the above embodiments, the main electronic device 120 does not comprise a microphone and a speaker, and the main processor 121 is further configured to receive, in the intercom transmission mode, a voice signal from the in-vehicle terminal device through the integrated short-range wireless communication module 123, and transmit the voice signal to the cloud server through the mobile communication module 122; and receive, in the intercom reception mode, a voice signal from the cloud server through the mobile communication module 122, and transmit the voice signal to the in-vehicle terminal device for output through the integrated short-range wireless communication module 123.

That is, in such an embodiment, the voice input and output in the intercom communication are realized using the microphone and the speaker of the in-vehicle terminal device, and the main electronic device 120 itself does not comprise a microphone and a speaker, which enables the main electronic device 120 to be easier to implement, and enables the microphone and the speaker to be closer to the user's head during the intercom communication process, thereby improving the call quality.

Figure 3:
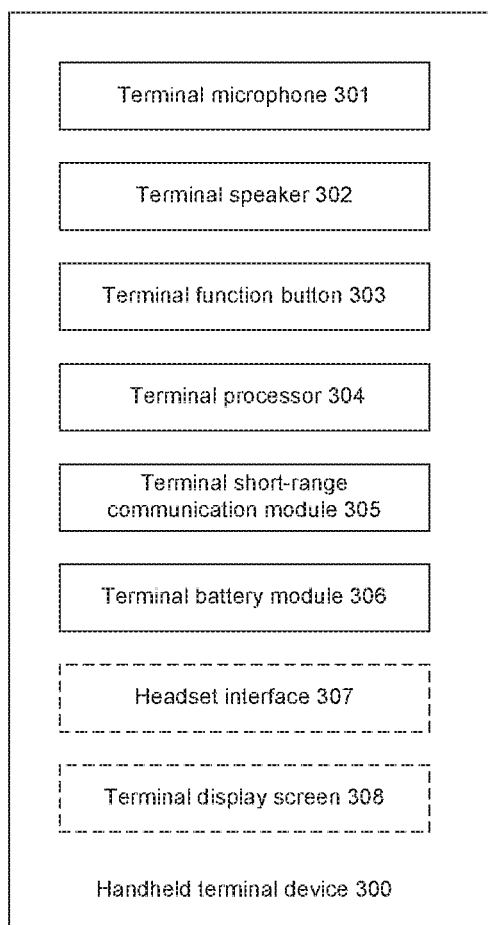
FIG. 3 illustrates a schematic block diagram of an in-vehicle terminal device of an intelligent rearview mirror according to another embodiment of the present disclosure.

In a further embodiment of the present disclosure, as shown in FIG. 3, the in-vehicle terminal device is a handheld terminal device 300, which comprises: a terminal microphone 301; a terminal speaker 302; a terminal function button 303 configured to receive a user's press or release and generate a press signal or release signal; a terminal processor 304 configured to generate the intercom transmission activation signal or the intercom reception activation signal according to the press signal or the release signal, and transmit the intercom transmission activation signal or the intercom reception activation signal through the short-range wireless communication module 305; the terminal short-range communication module 305 configured to establish a connection with the integrated short-range wireless communication module 301 of the main electronic device, and transmit the intercom transmission activation signal or the intercom reception activation signal to the integrated short-range wireless communication module; and a terminal battery module 306 configured to provide power to the handheld terminal device; wherein the terminal processor 304 is further configured to: receive, in the intercom transmission mode, a voice signal from the terminal microphone 301, and transmit the voice signal to the main electronic device 120 through the terminal short-range wireless communication module 305; and receive, in the reception mode, a voice signal from the main electronic device 120 through the terminal short-range wireless communication module 305, and transmit the voice signal to the terminal speaker 302 for output.

The terminal microphone 301 may be a single microphone or a dual microphone. With the dual microphone, ambient noises may be better filtered out.

The terminal processor 304 may be any apparatus having corresponding computing and control functions, for example, a microprocessor, a coprocessor, a processor, etc., or any other processing apparatus or unit including an integrated circuit such as an ASIC, a FPGA etc. In some embodiments, the terminal processor 304 may comprise an associated memory having a software program stored therein, which may be loaded and executed by the terminal processor 304 to perform functions or operations thereof.

The terminal short-range wireless communication module 305 may be a communication module or communication interface based on any short-range wireless communication technology, for example, a WLAN module or a Bluetooth module, and corresponds to the integrated short-range wireless communication module 123 on the main electronic device 120.

In some further embodiments, the terminal function button is a physical button.

In some further embodiments, the handheld terminal device 300 further comprises a headset interface 307 to be connected to a headset.

In some further embodiments, the handheld terminal device 300 may further include a terminal display screen 308 which may be used to display information related to intercom communication, for example, an intercom communication mode or state, a license plate number of an intercom member, and location information of a vehicle, etc., and may be used to display information, for example, an electricity amount, operation functions, etc. of the handheld terminal device 300.

In some further embodiments, connection information of the handheld terminal device 300 as well as electricity amount information of the handheld terminal device 300 may be displayed on the display screen and/or the touch screen of the main electronic device 120.

The handheld terminal device 300 according to these embodiments of the present disclosure has advantages in that a driver is prevented from raising his/her hand to touch a button on the rearview mirror, and in some embodiments, function buttons used for the handheld terminal are physical buttons, which have certain rebound force feedback to ensure tactile perception in the driver's operation and improve the driving safety. Further, as described above, as the handheld terminal device 300 comprises a speaker and a microphone, the rearview mirror can be easier to implement, and notification quality can be improved.

In still other embodiments of the present disclosure, the in-vehicle terminal device is a Bluetooth headset, which comprises: a terminal microphone; an audio output module; a terminal function button configured to receive a user's press or release and generate a press signal or a release signal; a terminal processor configured to generate an intercom transmission activation signal or an intercom reception activation signal according to the press signal or the release signal, and transmit the intercom transmission activation signal or the intercom reception activation signal through a terminal Bluetooth module; the terminal Bluetooth module configured to establish a connection with the integrated short-range wireless communication module of the main electronic device, and transmit the intercom transmission activation signal or the intercom reception activation signal to the integrated short-range wireless communication module, wherein the integrated short-range wireless communication module is an integrated Bluetooth module; and a terminal battery module configured to provide power to the Bluetooth headset; wherein the terminal processor is further configured to: receive, in the intercom transmission mode, a voice signal from the microphone and transmit the voice signal to the main electronic device through the terminal Bluetooth module; and receive, in the intercom reception mode, a voice signal from the main electronic device through the terminal Bluetooth module, and transmit the voice signal to the audio output module for output.

The Bluetooth headset may be implemented by adding the intercom function according to the embodiment of the present disclosure to a Bluetooth headset in the related art.

Compared with the handheld terminal device 300 described above, the Bluetooth headset may be worn on a user's head, and therefore the Bluetooth headset is more convenient to carry, is operated simply, and has good call quality.

In still other embodiments of the present disclosure, the in-vehicle terminal device is an in-vehicle audio system, and comprises: a terminal microphone; a terminal speaker; a terminal function button configured to receive a user's press or release and generate a press signal or a release signal; a terminal processor configured to generate an intercom transmission activation signal or an intercom reception activation signal respectively according to the press signal or the release signal, and transmit the intercom transmission activation signal or the intercom reception activation signal through a terminal short-range communication module; and the terminal short-range communication module configured to establish a connection with the integrated short-range wireless communication module of the main electronic device, and transmit the intercom transmission activation signal or the intercom reception activation signal to the integrated short-range wireless communication module signal; wherein the terminal processor is further configured to: receive, in the intercom transmission mode, a voice signal from the microphone, and transmit the voice signal to the main electronic device through the terminal short-range communication module; and receive, in the intercom reception mode, a voice signal from the main electronic device through the terminal short-range communication module, and transmit the voice signal to the speaker for output.

The in-vehicle audio system may be implemented by adding the intercom function according to the embodiment of the present disclosure to an in-vehicle audio system in the related art.

In these embodiments, functions such as voice input and output etc. of the in-vehicle audio system in the related art are used, and therefore the technical solutions according to these embodiments have a higher integration degree, better call quality, and a cleaner vehicle interior than a technical solution using a separate in-vehicle terminal device.

The main electronic device 120 and the in-vehicle terminal device which cooperates with the main electrode device 120 according to various embodiments of the present disclosure have been described above with reference to the accompanying drawings, and it should be illustrated that the above illustration and description are merely exemplary and do not limit the present disclosure. In other embodiments of the present disclosure, the main electronic device 120 and the in-vehicle terminal device may have more, fewer, or different components and functions, and relationships of positions, connections, and functions etc. among various components may be different from those described and illustrated.

As can be seen from the above description, the present disclosure provides an intelligent rearview mirror having an integrated intercom function, which may comprise only the main electronic device 120, or may also comprise both the main electronic device and the in-vehicle terminal device, wherein the in-vehicle terminal device may be a Bluetooth button device, a handheld terminal device, a Bluetooth headset, or an in-vehicle audio system etc.

Figure 4:
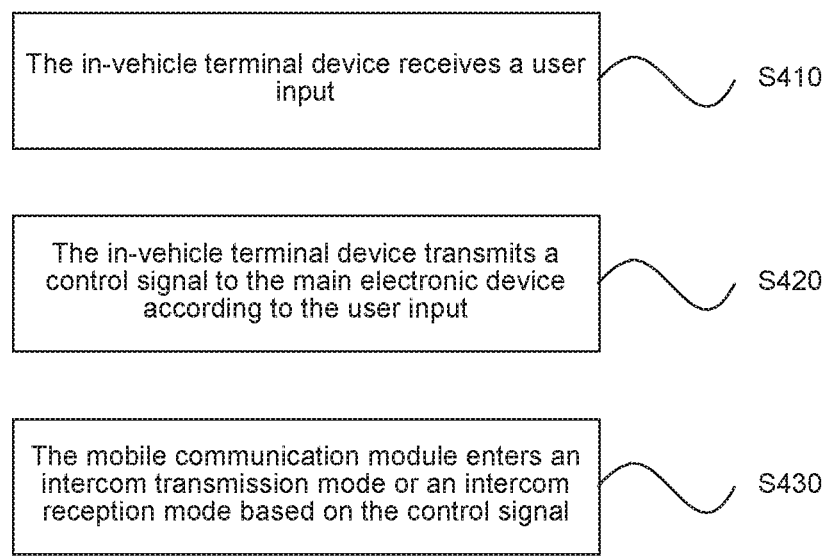
FIG. 4 illustrates a schematic diagram of an intercom communication process according to an embodiment of the present disclosure.

Reference is now made to FIG. 4, illustrated is a schematic diagram of a method 400 for operating an intelligent rearview mirror according to an embodiment of the present disclosure. The intelligent rearview mirror may be the intelligent rearview mirror 100 as shown in FIG. 1A. Therefore, the description and explanation of the intelligent rearview mirror 100 and various components thereof in conjunction with FIGS. 1A, 1B, 2, and 3 in the above embodiments are equally applicable here.

As shown in FIG. 4, in step S410, the in-vehicle terminal device receives a user input.

In step S420, the in-vehicle terminal device transmits a control signal to the main electronic device according to the user input.

In step S430, the mobile communication module of the main electronic device enters an intercom transmission mode or an intercom reception mode for intercom communication with the cloud server based on the control signal.

Specifically, in a case that the in-vehicle terminal device does not have a microphone and a speaker (as shown in FIG. 2), in the intercom transmission mode, the main processor receives a voice signal from a user, and transmits the voice signal to the cloud server; and in the intercom reception mode, the main processor receives a voice signal from the cloud server and outputs the voice signal to the user.

Specifically, in a case that the in-vehicle terminal device has a microphone and a speaker (as shown in FIG. 3), in the intercom transmission mode, the in-vehicle terminal device receives a voice signal and transmits the voice signal to the main electronic device, and the main electronic device transmits the voice signal to the cloud server after receiving the voice signal; and in the intercom reception mode, the main electronic device receives a voice signal from the cloud server, and transmits the received voice signal to the in-vehicle terminal device, and the in-vehicle terminal device outputs the voice signal to the user after receiving the voice signal.

It can be understood that the above-described embodiments of the present disclosure are merely exemplary embodiments used to explain the principles of the present disclosure, and the present disclosure is not limited thereto. Various modifications and improvements can be made by those of ordinary skill in the art without departing from the spirit and essence of the present disclosure, and such modifications and improvements are also considered to be within the protection scope of the present disclosure. The protection scope of the present disclosure is to be limited only by the meaning of the language expressions of the appended claims and their equivalents.

We claim:

1. An intelligent rearview mirror, comprising:
a mirror body;
a main electronic device disposed on the mirror body, and comprising a main processor and a mobile communication module; and
an in-vehicle terminal device, separated from the mirror body and the main electronic device, and configured to transmit a control signal to the main electronic device,
wherein the main processor is configured to control, according to the control signal, the mobile communication module to switch between an intercom transmission mode for intercom communication with a cloud server and an intercom reception mode for intercom communication with the cloud server,
wherein the main electronic device further comprises an integrated short-range wireless communication module, and the in-vehicle terminal device further comprises a terminal short-range wireless communication module, and the in-vehicle terminal device transmits the control signal through communication between the integrated short-range wireless communication module and the terminal short-range wireless communication module,
wherein the main electronic device is connected to a vehicle control system, and the main processor is configured to receive an accident signal from the vehicle control system, generate rescue request information, and transmit the rescue request information to members of an intercom group, which is established in the cloud server in advance, through the mobile communication module.

2. The intelligent rearview mirror according to claim 1, wherein the main electronic device further comprises an integrated microphone and an integrated speaker, and the main processor is further configured to:
control, in the intercom transmission mode, the integrated microphone to receive a voice signal, and control the mobile communication module to transmit the voice signal to the cloud server; and
control, in the intercom reception mode, the mobile communication module to receive a voice signal from the cloud server, and control the integrated speaker to output the voice signal.

3. The intelligent rearview mirror according to claim 2, wherein the in-vehicle terminal device further comprises:
a terminal function button configured to receive a user's press or release and generate a press signal or a release signal; and
a terminal processor configured to generate the control signal according to the press signal or the release signal and transmit the control signal through the terminal short-range wireless communication module.

4. The intelligent rearview mirror according to claim 3, wherein the in-vehicle terminal device is integrated in a steering wheel.

5. The intelligent rearview mirror according to claim 1, wherein the in-vehicle terminal device comprises:
a terminal microphone;
a terminal speaker;
a terminal function button configured to receive a user' press or release and generate a press signal or a release signal; and
a terminal processor configured to generate the control signal according to the press signal or the release signal,
wherein the terminal processor is further configured to:
control, in the intercom transmission mode, the terminal microphone to receive a voice signal, and transmit the voice signal to the main electronic device; and
receive, in the intercom reception mode, a voice signal from the main electronic device, and control the terminal speaker to output the voice signal,
wherein, in the intercom transmission mode, the main electronic device transmits the voice signal to the cloud server through the mobile communication module after receiving the voice signal; and
in the intercom reception mode, the voice signal from the main electronic device is received by the main electronic device from the cloud server.

6. The intelligent rearview mirror according to claim 5, wherein the terminal function button is a physical button.

7. The intelligent rearview mirror according to claim 5, wherein the in-vehicle terminal device is one of a handheld terminal device, a Bluetooth headset, or an in-vehicle audio system.

8. The intelligent rearview mirror according to claim 1, wherein the main electronic device further comprises a display screen, and the main processor is further configured to control, during an intercom call, the display screen to display one of information related to intercom members or connection state information of the in-vehicle terminal device.

9. The intelligent rearview mirror according to claim 8, wherein the display screen is a touch screen.

10. The intelligent rearview mirror according to claim 1, wherein the main electronic device further comprises an integrated function button for an intercom function, wherein the integrated function button is a physical button.

11. The intelligent rearview mirror according to claim 9, wherein the main electronic device further comprises an integrated function button for an intercom function, wherein the integrated function button is a virtual button on the touch screen.

12. The intelligent rearview mirror according to claim 1, wherein:
the in-vehicle terminal device receives a user input;
the in-vehicle terminal device transmits a control signal to the main electronic device according to the user input; and
the mobile communication module of the main electronic device switches between an intercom transmission mode and an intercom reception mode for intercom communication with the cloud server based on the control signal.

13. The intelligent rearview mirror according to claim 2, wherein:
the in-vehicle terminal device receives a user input;
the in-vehicle terminal device transmits a control signal to the main electronic device according to the user input; and
the mobile communication module of the main electronic device switches between an intercom transmission mode and an intercom reception mode for intercom communication with the cloud server based on the control signal.

14. The intelligent rearview mirror according to claim 13, wherein
in the intercom transmission mode, the main processor receives a voice signal from a user and transmits the voice signal to the cloud server; and
in the intercom reception mode, the main processor receives a voice signal from the cloud server and outputs the voice signal to the user.

15. The intelligent rearview mirror according to claim 5, comprising:
the in-vehicle terminal device receives a user input;
the in-vehicle terminal device transmits a control signal to the main electronic device according to the user input; and
the mobile communication module of the main electronic device switches between an intercom transmission mode and an intercom reception mode for intercom communication with the cloud server based on the control signal.

16. The intelligent rearview mirror according to claim 15, wherein
in the intercom transmission mode,
the in-vehicle terminal device receives a voice signal and transmits the voice signal to the main electronic device; and
the main electronic device transmits, the voice signal to the cloud server after receiving the voice signal; and
in the intercom reception mode,
the main electronic device receives a voice signal from the cloud server, and transmits the received voice signal to the in-vehicle terminal device; and
the in-vehicle terminal device outputs the voice signal to the user after receiving the voice signal.

* * * * *